United States Patent [19]

Wolfe

[11] 4,090,319
[45] May 23, 1978

[54] FISHING LURE

[75] Inventor: Henry S. Wolfe, Clearwater, Fla.

[73] Assignee: American Clearwater Corp., Clearwater, Fla.

[21] Appl. No.: 756,434

[22] Filed: Jan. 3, 1977

[51] Int. Cl.² ............................................. A01K 85/00
[52] U.S. Cl. .................................. 43/42.19; 43/42.09;
43/42.39; 43/42.49
[58] Field of Search ................... 43/42.19, 42.2, 42.23,
43/42.49, 42.09, 42.39

[56] References Cited

U.S. PATENT DOCUMENTS

| | | | |
|---|---|---|---|
| 1,062,980 | 5/1913 | Lewis | 43/42.19 |
| 1,916,582 | 7/1933 | Pflueger | 43/42.19 |
| 2,580,104 | 12/1951 | King | 43/42.49 X |
| 2,660,827 | 12/1953 | Pero | 43/42.19 |
| 2,674,823 | 4/1954 | Gellings | 43/42.19 X |

*Primary Examiner*—Edgar S. Burr
*Assistant Examiner*—Daniel J. Leach
*Attorney, Agent, or Firm*—Hubbell, Cohen, Stiefel & Gross

[57] ABSTRACT

An improved spinner type fishing lure securable to a fishing line comprise a shaft; first means extending upwardly from the shaft substantially at the front end thereof for defining a first point of attachment to the line; second means extending upwardly from the shaft between the first means and the rear end of the shaft for defining a second point of attachment to the line; means for securing a hook to the shaft at the rear end; a weighted member secured to the shaft intermediate the first and second line attachment points; a spinner blade, means for supporting the blade on the shaft for rotation about the axis thereof, the spinner blade supporting means being disposed on the shaft intermediate the second attachment point and the hook securing means; and means secured to the shaft intermediate the spinner blade and the hook supporting means for spacing the blade from the hook.

5 Claims, 2 Drawing Figures

U.S.Patent May 23, 1978 4,090,319

FISHING LURE

BACKGROUND OF THE INVENTION

1. Field of the Invention

This invention pertains to fishing lures and more particularly to a weighted type casting or trolling lure having a spinner blade.

2. Prior Art

During fishing a lure is either cast into the water or trolled behind a boat. In casting, the lure is continuously retrieved then recast, constantly keeping the lure in motion. In trolling the lure is kept in constant motion by being trolled at a fixed distance behind the moving boat. Much of the success of fishing lures employed in casting and trolling is attributed to the spinner blade, which, because of its hydrodynamic design, rotates as the lure is drawn through the water. The rapid rotation of the spinner blade is particularly attractive to fish which interpret the flash produced by the blade as potential prey. Thus, one of the most important features of any good spinner type lure is that the spinner blade be capable of high speed, free swinging rotation.

According to prior art weighted spinner type fishing lure construction, the fishing line is attached at one end of the lure, and the hook at the other, with the weighted body between. Because of this arrangement, the gravitational forces on the lure tend to angle the lure downwardly at the hook end thereof as the lure is retrieved. This angular orientation results in non-uniform water flow over the face of the spinner blade. This in turn reduces the rotational speed of the spinner, whereby the effectiveness of the lure is reduced. This problem is particularly accentuated when slow retrieve speeds are used. Furthermore, the angular orientation of the lure results in frictional forces between the shaft and the clevis which further reduce the rotational speed of the spinner blade.

Another problem with prior art spinner type lures has been that the rotation of the spinner blade imparts a twisting effect to the lure and hence to the line. A twisted fishing line is one of the most annoying problems to all anglers. A number of solutions to this problem, none of which have been entirely successful, have been suggested. One such solution has been to attach the spinner blade to the shaft of the lure such that the blade may rotate independently thereof. This has been accomplished, for example, by attaching the spinner blade to the lure by means of a clevis (see, for example, U.S. Pat. No. 2,785,496). In other lures, swivel connectors are used to connect the portion of the lure having the spinner blade attached thereto to the remainder of the lure (see, for example, U.S. Pat. No. 2,119,504). Like the use of clevises, this arrangement has been only partially successful. Moreover, it has been found that swivel connectors partially destroy the freedom of action of the lure. In still other lures, weights or rudders depending from the lure are employed to provide a "keel type" effect. Since rotation of the lure must be accompanied by rotation of the weight or rudder, the gravitational force on the weight or rudder increases the threshold rotational force which must be imparted to the lure (as by the spinner blade) before rotation of the lure will occur (see, for example, U.S. Pat. Nos. 2,119,504, 2,785,496 and 3,461,597). The effectiveness of this latter arrangement has been largely negated by the angular orientation which the lure, and hence the weight or rudder, assumes as it is drawn through the water during retrieve. Clearly, the angular orientation of the weight or rudder reduces the torque which must be imparted to the lure by the blade before rotation of the lure, and hence the line, will occur. The angular orientation also increases the friction between the clevis and shaft so that the amount of force necessary to rotate the shaft is decreased. This is, of course, undesirable.

SUMMARY OF THE INVENTION

According to the invention we have developed a lure for casting and trolling which comprises a shaft; first means extending upwardly from the shaft substantially at the front end thereof defining a first point of attachment to a fishing line; second means extending upwardly from the shaft for defining a second point of attachment to the fishing line; means for securing a hook to the shaft at the rear end; a weighted member secured to the shaft intermediate the first and second line attachment points; a spinner blade, means for supporting the blade on the shaft for rotation about the axis thereof, the supporting means being disposed on the shaft intermediate the second attachment point and the hook securing means; and means secured to the shaft intermediate the spinner blade and the hook securing means for spacing the blade from the hook.

By providing means for securing the line to the lure at both the front and the central portion thereof, the lure assumes a horizontal orientation during retrieve, the tendency of the lure to assume an angular orientation being opposed by the restoring force imparted to the lure by the line. As a result, the weighted member provides a true keel effect below the two line connection points thereby maximizing the gravitational force which must be overcome before twisting of the line can occur. In addition, continuous high speed free swinging rotation of the spinner blade about the shaft is assured.

Further, because of the particular arrangement wherein the weight is disposed in front of the spinner assembly, rather than behind the spinner as in most conventional spinner lures, different length and size weights can be used without interfering with the correct fixed distance that the spinner blade is separated from the hook. Moreover, because varied length and size weights can be used the lure can be fished at any desired depth with any desired blade size.

DETAILED DESCRIPTION OF THE PREFERRED EMBODIMENT

Figure 1:
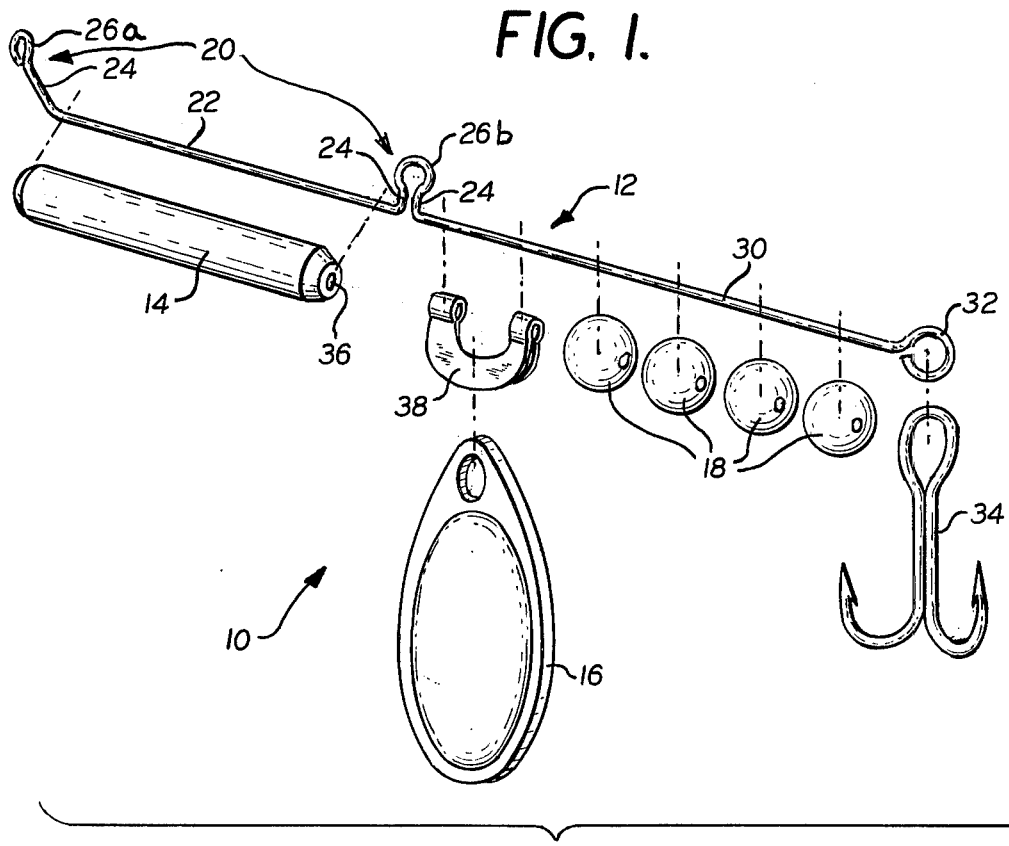
FIG. 1 is an exploded perspective view showing the preferred embodiment of the improved fishing lure according to the present invention.

Referring now to the drawing in detail, the preferred lure 10 in accordance with the present invention is illustrated. As shown, the lure 10 includes a shaft 12 upon which a weighted member 14, a clevis 38 with spinner blade 16 attached, and a plurality of beads 18 are supported.

Figure 2:
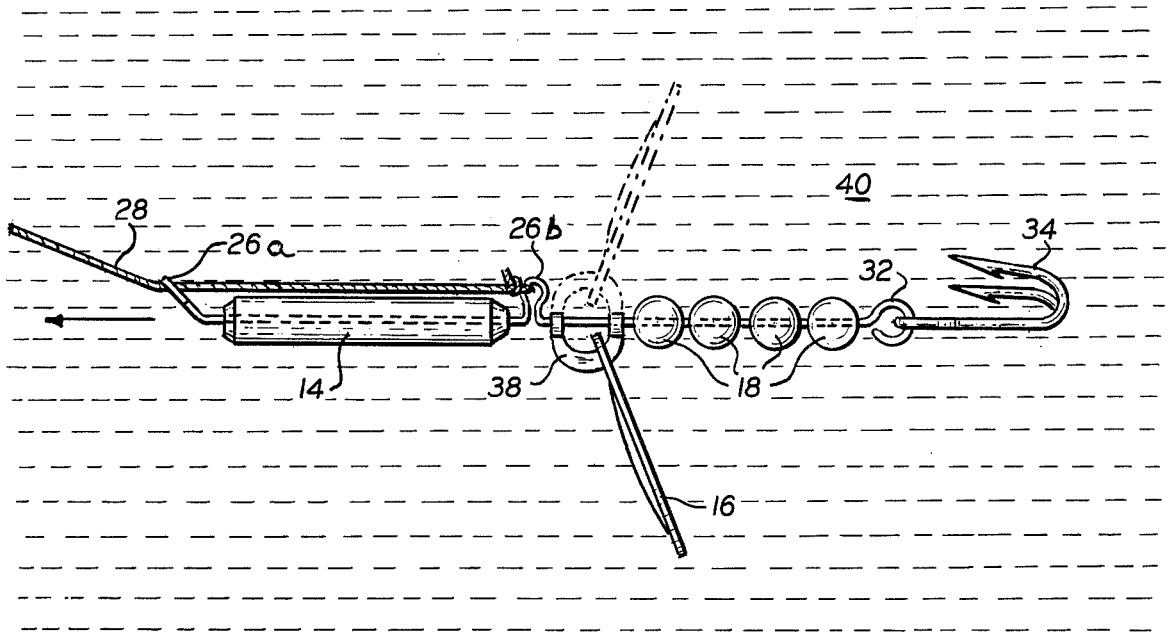
FIG. 2 is a view in side elevation showing the orientation of the preferred lure during retrieve.

As best shown in FIGS. 1 and 2, the shaft 12 has a cradle portion 20 comprised of a shank 22 having upwardly extending ends 24 terminating in eyelets 26, the eyelets defining at least two spaced apart points for attaching the lure 10 to a fishing line 28. As presently preferred and shown, the planes of eyelets 26 are orthogonal. Line attachment may be accomplished, for example, as shown in FIG. 2, wherein the line 28 passes through the eyelet 26a, the end of the line being tied to the eyelet 26b. The shaft 12 also includes an elongated portion 30 extending away from the eyelet 26b, portion 30 being substantially coaxial with the shank 22. As presently preferred and shown, the free end of the elongated portion 30 terminates in an additional eyelet 32 which comprises means for attaching a hook to the lure 10. While any type of hook may be used, the double hook 34 shown in FIGS. 1 and 2 by way of example is preferred. With the hook 34 attached to the eyelet 32 with the barbed points upward as shown in FIG. 2, the lure may be worked almost in direct contact with the bottom without snagging.

As presently preferred and shown in FIG. 1, the weighted member 14 is comprised of precision screw machine brass although any material having the proper weight and corrosion resistance may be employed. Thus, for example, a lead body preferably overcoated with plastic which may be colored as by paint may also be used. In order to avoid excessive movement of the weighted member 14 on the shank 22, the length of the cylinder is preferably substantially equal to the length of the shank 22. Alternatively, the weighted member 14 may be fixedly secured to the shank 22 as by making shank 22 and bore 36 non-circular in cross section.

The spinner blade 16 is supported on the elongated portion 30 for free swinging rotation about the axis thereof. As presently preferred and shown, this is accomplished by employing a conventional clevis 38. The clevis 38 should be sufficiently loosely secured to the elongated portion 30 in order to avoid the frictional forces between the clevis 38 and the elongated portion 30 from slowing down the rotational speed of the spinner 16. On the other hand, the clevis must not be secured so loosely that wobbling of the spinner blade 16 will occur.

Spacing means, preferably comprised of the spherical beads 18, are disposed on the elongated portion 30 intermediate the spinner blade 16 and the eyelet 32, the beads 18 functioning in the conventional manner to prevent the blade 16 from shielding the hook 34 during a strike. Preferably, although not necessarily, the beads 18 are comprised of brass, at least the two outside beads preferably being comprised of solid brass, solid brass being less likely to have irregular surfaces which tend to slow down the rotational speed of the blade 16. Inasmuch as the forwardmost bead 18 represents a potential point of contact with the clevis 38, desirably these contact points will be made bearing smooth in order to insure continuous high speed rotation of the spinner 16.

Referring now to FIG. 2, the lure 10 is shown in a body of water 40. With the line 28 secured to the lure 10 as shown the normal tension present in the line 28 during retrieve applies a force at the points of attachment of the lure 10 to the line 28, viz., the eyelets 26a and 26b. Because of this arrangement, the lure 10 will assume a substantially horizontal orientation during retrieve, whereas without this invention it would assume an angular orientation with the hook end angled downward in the water. In conventional lures the gravitational angling downward of the rear end of the lure is partially offset by the drag of the rotating blade as it is drawn through the water. However, increasing the weight of the lure increases the angle, while in my invention substantially the entire weight of the lure is between the two eyelet supporting points. As a result, the keel effect provided by the weighted member 14, which assumes a substantially horizontal orientation beneath the line 28, is enhanced. Thus, it will be apparent from FIG. 2 that the gravitational force on the weight 14 which must be overcome before rotation of the shaft 12 can occur substantially reduces the possibility of line twist. An additional advantage occasioned by the horizontal orientation of the lure 10 is that the frictional forces between the clevis 38 and the adjacent bead 18 is minimized, whereby the torgue imparted to the shaft 12 by rotation of the spinner-clevis assembly is reduced, thereby further reducing the possibility of line twist. Further, because of this reduction in frictional forces, the speed of rotation of the spinner 16 about the portion 30 is increased, high speed free swinging rotation of the spinner being essential to the effectiveness of all spinner type fishing lures. In addition, uniform water flow over the blade face is insured which in turn further maximizes the speed of rotation attainable by the spinner 16.

Moreover, by employing the preferred arrangement shown in FIGS. 1 and 2 in which the weighted member 14 is disposed in front of the spinner-hook assembly, different size weights may be employed with different size spinner blades and vice versa. This allows fishing at any desired depth while still allowing the selection of the proper size spinner blade to attract an average size fish for the particular area.

It will be appreciated that various changes may be made in the preferred embodiment described hereinabove without departing from the scope of this inveniton. Thus, for example, the shaft 12 need not be a single piece construction as shown. Further, methods other than the clevis 38 may be readily devised by the skilled art worker for securing the blade 16 for free swinging rotation about the axis of the elongated portion 30. Additionally, a variety of spacing means other than the beads 18 may be employed. Moreover, while the weighted member 14 is preferably secured to the shank 22 as shown, this too may be accomplished in a variety of different ways. Also, numerous other means other than the eyelets 26 may be employed for securing the line 28 to the lure 10. As a yet further modification, the length of ends 24 of shank 22 may be increased over their length as illustrated in the drawings thereby further enhancing the keel effect provided by weight 14.

Since these and other variations are within the scope of the present invention, it is intended that the preceding description should be construed as illustrative and not in the limiting sense, the scope of invention being defined by the following claims.

What is claimed is:

1. In a spinner type fishing lure having an elongated shaft, means for securing a hook to the shaft substantially at the rear end thereof, a rotatable hydrodynamically designed spinner blade supported on the shaft for rotation about the axis thereof as said lure is drawn through a liquid and said liquid hydrodynamically flows over said spinner blade, and means secured to the shaft intermediate the spinner blade and the hook supporting means for spacing the blade from the hook when the hook is secured to the shaft, the improvement comprising:

first substantially rigid support means extending upwardly from said shaft substantially at the front end thereof for providing a first substantially rigid support point for said lure on a fishing line;

second substantially rigid support means extending upwardly from said shaft between said first substantially rigid support means and said spinner blade for providing a second substantially rigid support point for attachment of said lure on said fishing line; and a weighted member secured to said shaft intermediate said first and second support points and disposed thereon for providing substantially the entire weight of said lure between said first and second support points for enabling a true keel effect occurrence for said weight disposed below said first and second support points, said first and second support means being disposed on said shaft for providing a substantially wobble-free hydrodynamic positional relationship for said spinner blade during retrieve of said lure and a substantially horizontal orientation for said lure when tension is applied to said fishing line during said retrieve for enabling substantially uniform hydrodynamic flow over said spinner blade during said retrieve of said lure; whereby high speed, free swinging rotation of said spinner blade is enhanced and twisting of said fishing line during said retrieve is minimized.

2. The weighted spinner lure of claim 1 wherein said first and second substantially rigid support means comprise first and second eyelets respectively disposed on said shaft, with said fishing line passing through said first eyelet and attached to said second eyelet.

3. The lure of claim 2 wherein said weighted member is cylindrically shaped, said cylinder having a longitudinal bore therethrough, said shaft being received in said bore, the portion of said shaft intermediate said first and second eyelets having a length substantially equal to the length of said cylinder and a shaft diameter substantially equal to the diameter of said bore whereby excessive movement of said weight on said shaft is avoided.

4. The lure of claim 1 wherein said weight is comprised of brass.

5. The lure of claim 1 further comprising a hook having two barbs, said hook being secured to said hook securing means to orient said barbs upward during retrieve.

* * * * *